R. COTTER.
Mining-Machinery.
No. 214,241. Patented April 15, 1879.
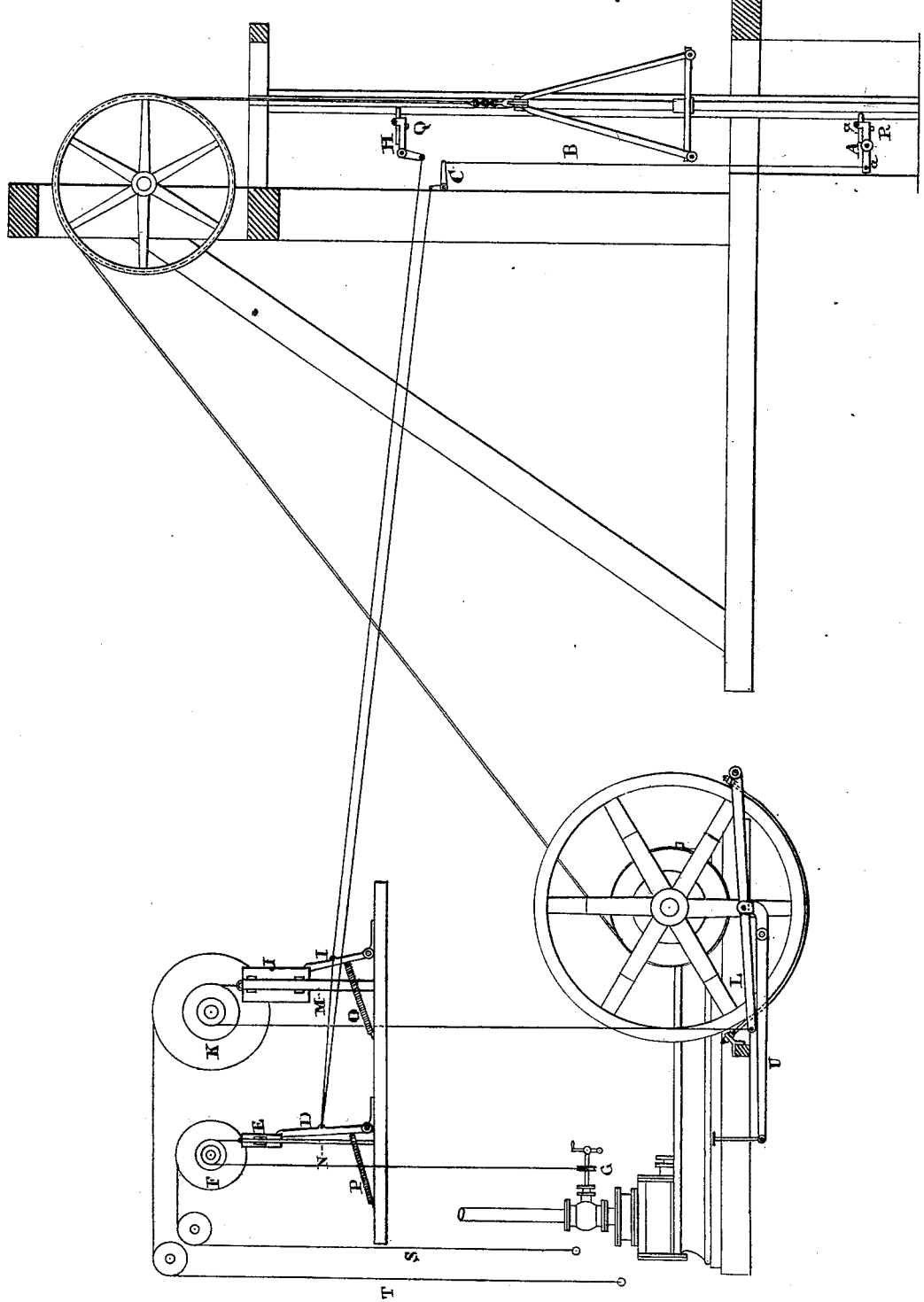
Witnesses
James Butler
Charles Holland
Inventor
Richard Cotter
by John M. Parker
Atty
N. PETERS, PHOTO-LITHOGRAPHER, WASHINGTON, D. C.

UNITED STATES PATENT OFFICE.

RICHARD COTTER, OF VIRGINIA CITY, NEVADA, ASSIGNOR OF ONE-HALF HIS RIGHT TO SAMUEL T. CURTIS, OF SAME PLACE.

IMPROVEMENT IN MINING MACHINERY.

Specification forming part of Letters Patent No. 214,241, dated April 15, 1879; application filed February 25, 1879.

*To all whom it may concern:*

Be it known that I, RICHARD COTTER, of Virginia City, county of Storey and State of Nevada, have invented a new and useful Improvement in Mining Machinery, whereby the overwinding of cables in hoisting-works is prevented, of which the following is a specification.

The object of my invention is to prevent the overwinding of cables in hoisting machinery, which sometimes occurs through the negligence of the engineer to stop his engine at the proper time when he is hoisting from a mine to the surface, thereby causing the cage to run up into the sheave or overhead pulley, and in many cases causing loss of life and serious damage to the machinery. The following is a description of my device, reference being had to the accompanying drawing.

A represents a lever located some forty feet (more or less) down from the mouth of the shaft, placed in such a position that the cage cannot possibly pass it without striking it. This lever is really a combination of two levers, $a$ and $a'$, $a'$ being pivoted on the top of $a$, so that when the cage passes down the lever $a'$ merely moves on its own pivot and assumes its normal condition as soon as the cage has passed without causing the lever $a$ to move at all; but when the cage strikes the end of lever $a'$ in rising the whole of the lever A is moved, pulling the cord B, which is connected to the bell-crank C. Another rope connects said bell-crank to the stanchion D, which is pivoted at its lower end and supports the weight E, hung from the windlass F, by means of a cord. The windlass F is connected by means of another cord to a small pulley, G, fastened on the stem of the throttle-valve of the engine.

H is a lever constructed on a similar principle to the lever A, and located several feet above, where it is necessary to hoist the cage in landing it at the surface, so that the hoisting mechanism will not be touched by the cage without great negligence of the engineer. This lever is connected by a cord with the stanchion I, made similar to D, only stronger, which supports the heavy weight J. This weight is connected by means of cords and the windlass K with the end of the brake-lever L, which operates the brake on the periphery of the fly-wheel of the hoisting-engine. The two weights are kept in position sidewise by means of the upright guides M and N. The stanchions are kept in position by means of springs O and P, so that when drawn from under the weights by the action of the cage they spring back to their places again, and are ready to catch and hold the weights as soon as they are raised.

Beneath the ends of the tripping-levers A and H are placed pins Q and R to keep the levers in their proper position.

It is customary with the engineers of hoisting-engines to shut off the steam from the engine when the ascending cage is at a point from forty to eighty feet from the surface, according to the power of the engine and the speed at which they are running.

The lever A, which connects with the throttle-valve of the engine, should be placed a little above this point in the shaft, so that in case the engineer neglects to shut off the steam at the proper time, the cage in passing will trip the lever A, which will cause the stanchion D to be pulled from the support of the weight E, allowing it to drop, and closing off the steam automatically, so that cages or tanks coming up loaded at the ordinary speed will just arrive above the landing.

In case the machinery is running slowly, and the load is not likely to reach the surface, the engineer can turn on the steam again and bring his load up, as he does not lose control of the steam-valve. After landing his cage the engineer can set the weight again by pulling down on the cord S until the weight is brought above the stanchion, which will then spring in to receive it.

In order to prevent slack cord about the pulley on the valve-stem, and to keep the cord from coming off the pulley when the engineer turns off the steam, I take a smaller cord and fasten it to the valve-cord a few feet above the pulley. I then pass this up over a pulley overhead, and to the opposite end attach a weight sufficiently heavy to hold up the slack of the valve-cord.

The lever H is only intended for use in case the cage runs too high above the landing, and experienced engineers may run several months without running their cages up to it; but in case they do the lever is tripped and the stanchion I removed from the support of the heavy weight J, which, falling, tightens the brake so firmly around the fly-wheel of the engine that the momentum of the machinery is almost instantly stopped. This trip is also connected with the stanchion D, so in case the steam has not been shut off previously it will be at the same time that the brake is applied.

The weight J can be set in place by pulling down on the cord T in the same manner as described for the other weight. When the weight is set the engineer can readily operate the brake by means of the ordinary foot-lever U, as usual. The weights in falling should drop on rubber springs or bumpers, especially the one that shuts off the steam, so as not to jam the valve.

This device can be used when sinking a shaft in a mine, to prevent the cages from being lowered on the men at work in the bottom, and also on incline machinery to prevent hoisting or lowering too far.

The arrangement for setting the brake can be easily attached to any common brake, and the arrangement for shutting off the steam can be connected to a slide-valve and made to close it by causing the weight to pull on the end of a lever in place of turning a pulley.

What I claim is—

1. The combination of the tripping-lever A, the bell-crank C, the stanchion D, and the weight E, the stanchion supporting the weight, which in falling closes the steam-valve of the engine, substantially as described, and for the purpose set forth.

2. The combination of the tripping-lever H, the stanchion I, and the weight J, the stanchion supporting the weight, which in falling tightens the brake of the engine, substantially as described, and for the purpose set forth.

RICHARD COTTER.

Witnesses:
JOHN W. PARKER,
JAMES BUTLER.